(12) United States Patent
Kidd

(10) Patent No.: US 11,731,910 B1
(45) Date of Patent: Aug. 22, 2023

(54) METHOD OF FABRICATING A CERAMIC MATRIX COMPOSITE FOR RESISTANCE AGAINST SILICON ATTACK

(71) Applicant: Rolls-Royce High Temperature Composites Inc., Cypress, CA (US)

(72) Inventor: Richard Kidd, Rancho Palos Verdes, CA (US)

(73) Assignee: ROLLS-ROYCE HIGH TEMPERATURE COMPOSITES INC., Cypress, CA (US)

(*) Notice: Subject to any disclaimer, the term of this patent is extended or adjusted under 35 U.S.C. 154(b) by 40 days.

(21) Appl. No.: 17/514,744

(22) Filed: Oct. 29, 2021

(51) Int. Cl.
  C04B 35/80    (2006.01)
  C04B 35/628   (2006.01)
  C04B 35/626   (2006.01)
  C04B 35/657   (2006.01)
  C04B 35/65    (2006.01)

(52) U.S. Cl.
  CPC .......... *C04B 35/80* (2013.01); *C04B 35/6265* (2013.01); *C04B 35/62849* (2013.01); *C04B 35/62868* (2013.01); *C04B 35/62873* (2013.01); *C04B 35/62884* (2013.01); *C04B 35/62892* (2013.01); *C04B 35/62897* (2013.01); *C04B 35/65* (2013.01); *C04B 35/657* (2013.01); *C04B 2235/3826* (2013.01); *C04B 2235/428* (2013.01); *C04B 2235/5244* (2013.01); *C04B 2235/5256* (2013.01); *C04B 2235/614* (2013.01); *C04B 2235/616* (2013.01); *C04B 2235/6567* (2013.01); *C04B 2235/6583* (2013.01)

(58) Field of Classification Search
  CPC ............................ C04B 35/80; C04B 35/6265
  See application file for complete search history.

(56) References Cited

U.S. PATENT DOCUMENTS

| 6,485,791 B1* | 11/2002 | Nagaraj | C04B 41/89 |
| | | | 204/192.15 |
| 2016/0230570 A1* | 8/2016 | Harris | C04B 35/80 |
| 2021/0340067 A1* | 11/2021 | Boakye | C04B 35/62675 |

* cited by examiner

*Primary Examiner* — Robert A Vetere
(74) *Attorney, Agent, or Firm* — Crowell & Moring LLP

(57) ABSTRACT

A method of making a ceramic matrix composite (CMC) that may show improved resistance to chemical attack from molten silicon along with excellent mechanical strength is described. The method includes forming an interphase coating on one or more silicon carbide fibers, depositing a matrix layer comprising silicon carbide on the interphase coating, oxidizing the matrix layer to form an oxidized film comprising silicon oxide, depositing a wetting layer comprising silicon carbide on the oxidized film. After depositing the wetting layer, a fiber preform containing the silicon carbide fibers is heat treated. After the heat treatment, the fiber preform is infiltrated with a slurry. After infiltration with the slurry, the fiber preform is infiltrated with a melt containing silicon, and then the melt is cooled to form a ceramic matrix composite.

16 Claims, 6 Drawing Sheets

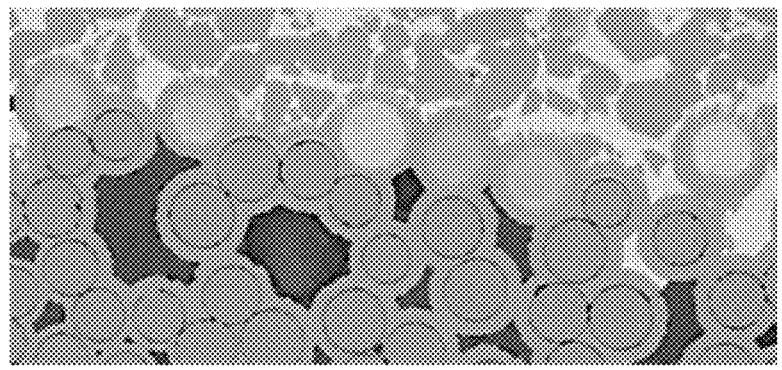
FIG. 4B
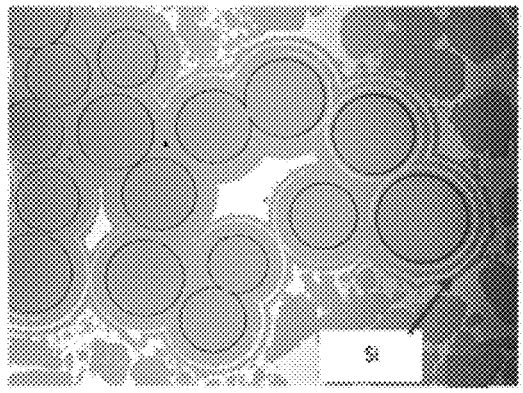
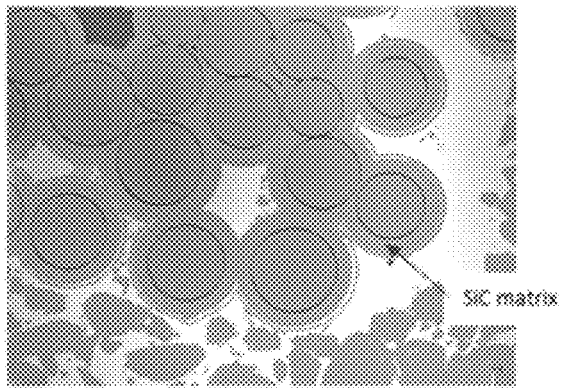
FIG. 5A　　　　　　　　　　FIG. 5B

METHOD OF FABRICATING A CERAMIC MATRIX COMPOSITE FOR RESISTANCE AGAINST SILICON ATTACK

TECHNICAL FIELD

The present disclosure relates generally to ceramic matrix composite (CMC) fabrication and more specifically to fabricating a CMC which is resistant to chemical attack from molten silicon while also exhibiting good mechanical properties.

BACKGROUND

In some cases, particularly when fabricating CMC components, the fiber preform can be susceptible to chemical attack from molten silicon. Ensuring that the fiber preform is protected from silicon attack can be a challenge. An improved CMC fabrication process resistant to silicon attack would be advantageous.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

FIGS. 4A and 4B are images taken by a light/laser microscope that show a cross-sectional view of an example ceramic matrix composite (CMC) formed when the wetting layer 205 and the heat treatment step 206 are omitted. The images are enlarged 10 times and 100 times, respectively, showing the coatings or layers exposed to silicon.

FIGS. 5A and 5B are images taken by a light/laser microscope that show a cross-sectional view of an example ceramic matrix composite (CMC) formed when the heat treatment step 206 is omitted. These images compare silicon attack on the matrix layer 103 and on the oxidized film 104, respectively.

DETAILED DESCRIPTION

A method of making a ceramic matrix composite (CMC) that may show improved resistance to chemical attack from molten silicon along with excellent mechanical strength is described.

The method described in detail below may provide protection of a fiber preform that includes an interphase coating, a matrix layer, a wetting layer, and one or more silicon carbide fibers from attack by molten silicon during melt infiltration in fabricating a ceramic matrix composite. It is recognized that chemical attack on silicon carbide fibers by silicon can decrease the mechanical strength of the ceramic matrix composite. A potential side benefit may be improved stability of surface layers exposed to the environment since the matrix layer and the wetting layer (described below) contain no low temperature oxide formers, such as boron.

Figure 1:
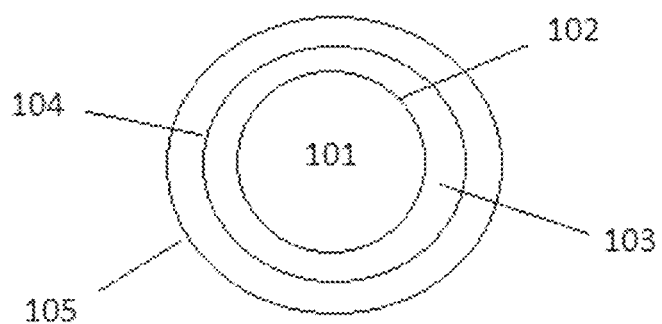
FIG. 1 is a cross-sectional schematic, not to scale, of an example silicon carbide fiber or fiber tow coated with multiple layers.
Figure 2:
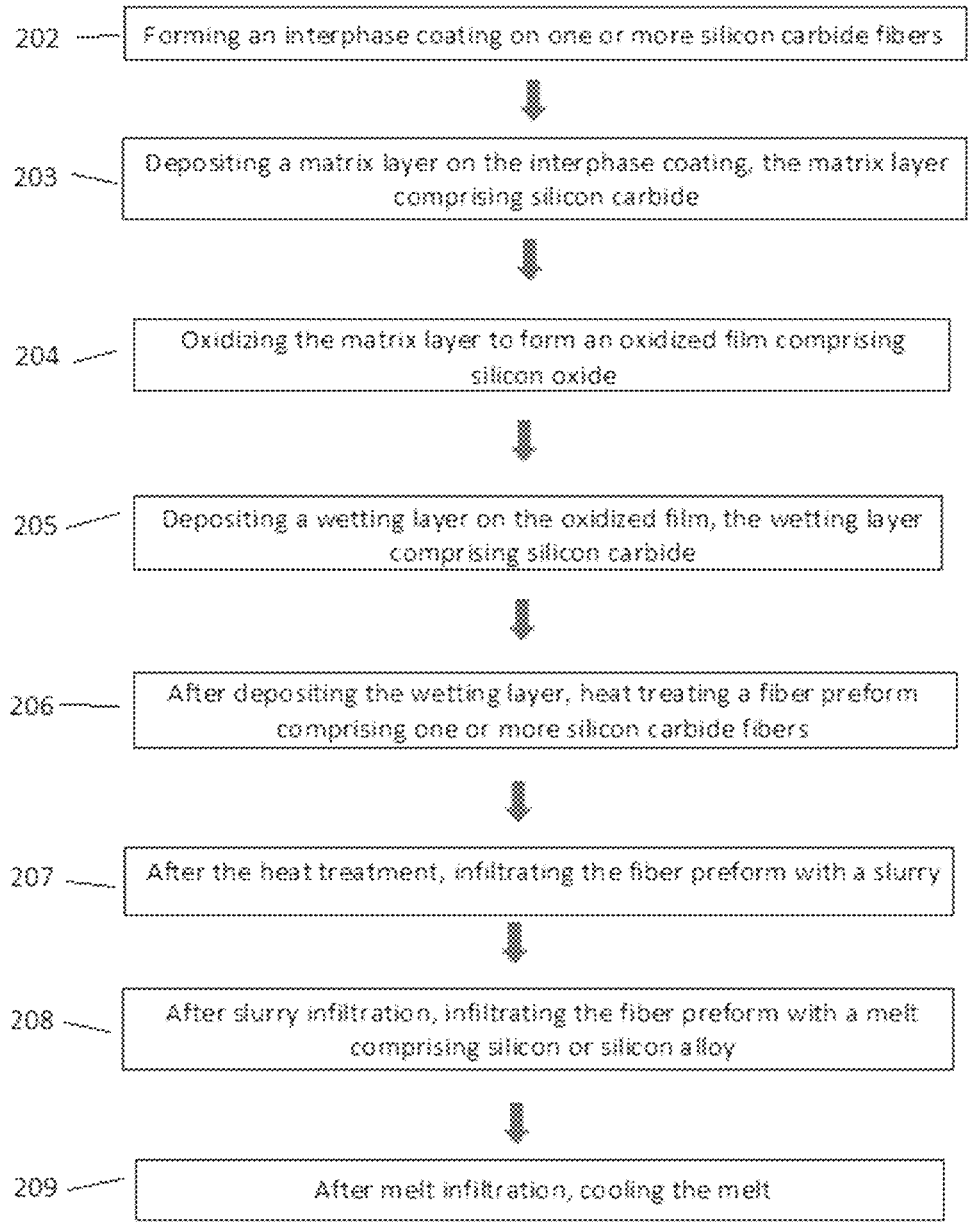
FIG. 2 is a flow chart showing exemplary steps of the method.

Referring to FIGS. 1 and 2, the method includes forming 202 an interphase coating 102 on one or more silicon carbide fibers 101. After forming the interphase coating, a matrix layer 103 comprising silicon carbide is deposited 203 on the interphase coating 102. The matrix layer 103 is then oxidized 204 to form an oxidized film 104 containing silicon oxide. A wetting layer 105 comprising silicon carbide is further deposited 205 onto the oxidized film 104 to protect the oxidized matrix layer, the interphase coating, and the silicon carbide fibers underneath. After the wetting layer is deposited, a fiber preform comprising the one or more silicon carbide fibers is heat treated 206. After the heat treatment, the fiber preform may undergo slurry infiltration 207 and then melt infiltration 208. Upon cooling 209 the melt, a dense CMC which includes the silicon carbide fibers formed with an interphase coating and covered by the matrix layer 103—oxidized film 104—wetting layer 105 assembly may be formed.

Due to the presence of the matrix layer—oxidized film—wetting layer assembly, shown in FIG. 1 as layers 103, 104, and 105, in combination with the heat treatment, the silicon carbon fibers may be protected from silicon attack during melt infiltration.

The depositing of the matrix layer 103 on the interphase coating 102 may be carried out using chemical vapor infiltration (CVI) methods, as described below. The matrix layer 103 may have a thickness of about 0.5 μm to about 15 μm. The matrix layer 103 comprising silicon carbide may be substantially free (e.g., free or nearly free) of low temperature oxide formers, such as boron.

As indicated above, the matrix layer 103 is then oxidized to form an oxidized film 104 containing silicon oxide (e.g., $Si_xO_y$, wherein $1 \leq x \leq 2$ and $1 \leq y \leq 3$) on the outer portion of the matrix layer. Oxidation of the matrix layer 103 can take place in ambient air or another environment including oxygen at a temperature of at least about 700° C. Typically, the temperature is not more than 1000° C. Oxidation may be carried out for a time duration of at least about 4 hours and/or no more than 12 hours. The resultant oxidized film may also include some amount of unoxidized silicon carbide. The oxidized film may be crystalline or amorphous. The oxidized film, formed on the outer portion of the matrix layer, may have a thickness of about 1 nm to about 10 nm. When the oxidized film is formed, it is surmised that oxygen replaces and/or substitutes for carbon atoms in the matrix layer. It is believed that more oxygen is found in the surface of the matrix layer, and oxygen gradually decreases in content with increasing penetration depth. Typically, the silicon oxide film 104 does not act as a wetting agent.

As indicated above, a wetting layer 105 comprising silicon carbide is further deposited on the oxidized film 104. The wetting layer 105 functions to improve the wetting of molten silicon during the melt infiltration step and to provide further protection against silicon attack. The wetting layer 105 comprising silicon carbide may be substantially free (e.g., free or nearly free) of low temperature oxide formers, such as boron. Deposition of the wetting layer may entail CVI utilizing a flow of a silicon-containing gas that further contains carbon, such as methyltrichlorosilane ($CH_3SiCl_3$), which is also known as MTS. Typically, the wetting layer 105 has a thickness in a range from about 0.2 µm to about 2 µm. CVI of the wetting layer 105 may be carried out for about 1 hour to about 60 hours, and generally at a temperature range from about 600° C. to about 1200° C.

To provide even more protection after the deposition of the wetting layer 105 onto the oxidized film 104, the preform containing the matrix layer 103—oxidized film 104—wetting layer 105 assembly is heat treated in a flow of carrier gas selected from $N_2$, Ar or $H_2$. Typically, the preform is heat treated at a temperature of at least about 1450° C. and/or no higher than about 1600° C. The heat treatment temperature may be no higher than the degradation temperature of the fiber. The heat treatment may take place over a time duration of at least about 2 hours, and/or typically not more than 8 hours. Preferably, the preform is heat treated in a flow of nitrogen for 4 hours at nominal 1500° C. It is believed that the heat treatment diffuses oxygen from the oxidized film over a larger area, including more silicon carbide grain boundaries, and potentially improves silicon carbide crystallinity (see Example 6 below).

In the method described above, the silicon carbide fibers 101 that undergo coating may be arranged in a fiber tow, unidimensional tape, braid, ply, and/or woven fabric (e.g., 2D woven, 3D woven and/or 2.5D woven), and may further be part of a fiber preform that has a predetermined shape, such as an airfoil shape. The fiber preform is typically produced in a lay-up process from the plies, woven fabrics and/or tapes and may be described as a three-dimensional framework of the silicon carbide fibers or fiber tows. Typically, the silicon carbide fibers are assembled into a fiber preform prior to CVI.

The forming of the interphase coating 102 on the silicon carbide fibers 101 described in the above method may be carried out using chemical vapor infiltration (CVI). The interphase coating 102 may comprise boron nitride, silicon-doped boron nitride, and/or pyrolytic carbon. The interphase coating 102 may help to ensure a weak fiber-matrix interface in the finished CMC and promote matrix crack deflection, thereby improving fracture toughness. The interface coating 102 may have a thickness in a range from about 0.10 µm to about 5.0 µm, and deposition of the interface coating layer may take place over a time duration of about 3 to about 60 hours.

Generally speaking, chemical vapor infiltration (CVI) entails flowing gaseous reagents at an elevated temperature through a furnace or reaction chamber containing one or more porous specimens to be coated. The one or more porous specimens may comprise any arrangement of the silicon carbide fibers (e.g., a fiber preform and/or fiber tows, as discussed below), where interstices between adjacent silicon carbide fibers may be understood to constitute pores. During CVI, the gaseous reagents may infiltrate the porous specimen(s) (e.g. the fiber preform and/or the fiber tows) and chemically react to form a deposit, coating or layer on exposed surfaces of the silicon carbide fibers. The porous specimen(s) may be un-tooled or constrained with a tool during deposition. A suitable tool may include through-holes for passage of the gaseous reagents and may be formed of a chemically inert and/or refractory material, such as graphite or silicon carbide, which is stable at the elevated temperatures at which deposition takes place. Through-holes in the tool may have a diameter or width sized to allow for a sufficient flow of gaseous reactants into the porous specimen during CVI. The tool may have a single-piece or multi-piece construction suitable for constraining the porous specimen(s) in a desired configuration and for easy removal after deposition of the coatings.

After deposition of the coatings or layers, the fiber preform may be referred to as a rigidized preform. Deposition of the coatings or layers may be followed by slurry infiltration to impregnate the rigidized preform with matrix precursors, forming what may be referred to as an impregnated fiber preform. The method may further comprise infiltrating the fiber preform with molten material (e.g., molten silicon or a molten silicon alloy) followed by cooling to form a densified ceramic matrix composite.

During melt infiltration, the molten material infiltrated into the rigidized and/or impregnated fiber preform may consist essentially of silicon (e.g., elemental silicon and any incidental impurities) or may comprise a silicon-rich alloy. Melt infiltration may be carried out at a temperature at or above the melting temperature of silicon or the silicon alloy which is infiltrated. Thus, the temperature for melt infiltration is typically in a range from about 1380° C. to about 1700° C. In one example, a ramp rate from an intermediate temperature of about 800° C. to a temperature above 1380° C. may be less than about 10° C./min. A suitable time duration for melt infiltration may be from 15 minutes to four hours, depending in part on the size and complexity of the ceramic matrix composite to be formed. A ceramic matrix is formed from ceramic particles as well as ceramic reaction products created from reactions between the molten material and any other particles (e.g., carbon particles, refractory metal particles) in the fiber preform. Preferably, the final ceramic matrix composite is substantially devoid of closed porosity.

As described herein, this unique combination of the matrix layer 103, the oxidized film 104, and the wetting layer 105 along with the heat treatment step, may have an advantageous synergistic effect to act as a protective barrier for the silicon carbon fibers against silicon attack during melt infiltration. With this robust protection against silicon attack during the melt phase, the resultant CMC component may exhibit improved mechanical strength having an ultimate tensile strength of at least about 50 ksi and possibly 65 ksi or higher, when in-plane tensile tested at 800° C. in ambient air.

EXAMPLES

Example 1

Figure 3:
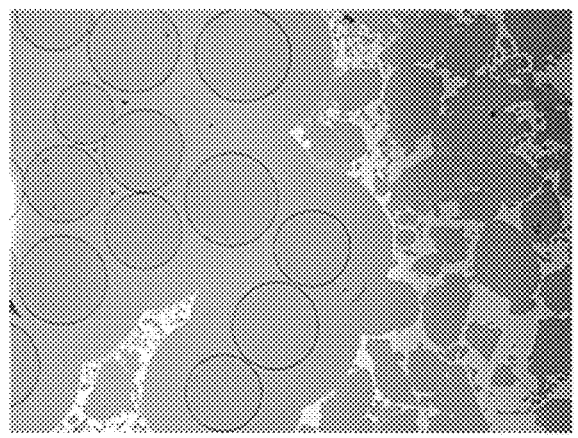
FIG. 3 is an image taken by a light/laser microscope that shows a cross-sectional view of an example ceramic matrix composite (CMC) having the matrix layer 103—oxidized film 104—wetting layer 105 assembly and including a heat treatment step 206. The heat-treated assembly acts as a protective barrier against silicon.

A preform of 5 harness satin Hi-$Ni_c$ (5HS- Hi Nicalon™ fiber) with a boron nitride interphase and a SiC matrix was oxidized forming a silicon oxide film in ambient air at about 800° C. for about 4 hours. The oxidized preform was then CVI coated with a wetting layer comprising silicon carbide to form a nominal 0.5 µm coating on the silicon oxide film. The preform was then heat treated in a flow of nitrogen for 4 hours at nominal 1500° C. After the heat treatment, the preform underwent combined slurry and melt infiltration. FIG. 3 shows a representative area of this example CMC component which contains the assembly. As seen from FIG. 3, no silicon attack on the fibers was observed. The ultimate tensile strength of the CMC component at 800° C. in ambient air was about 54 ksi.

Example 2

Figure 4A:
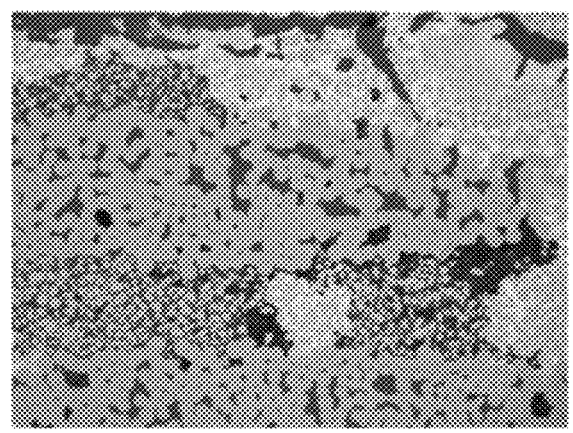

An example ceramic matrix composite (CMC) was prepared without including a wetting layer 105 and without a heat treatment step 206. FIG. 4 shows optical images of a cross-sectional view of the CMC enlarged 10 times (FIG. 4A) and 100 times (FIG. 4B), revealing that providing an oxidized film in the preform alone may not fully protect the silicon carbide fibers from silicon attack. The FIG. 4 images show that silicon (which appears as white spots) has infiltrated into the fiber preform, without having a wetting layer and being subjected to heat treatment, even though an oxidized film was formed on the outer portion of the matrix layer. FIG. 4B shows an expanded view of the fibers being attacked by silicon.

Example 3

An example ceramic matrix composite (CMC) was prepared forming an oxidized film 204, a wetting layer 205, but without a heat treatment step 206. FIG. 5A shows an optical image of the cross-sectional of a CMC wherein the oxidized film was formed at 700° C. with a duration of 1 hour. FIG. 5B shows an optical image of the cross-sectional of a CMC wherein the oxidized film was formed at 900° C. with a duration of 5 hours. While the extent of silicon penetration into the fiber preform was decreased by the deposition of a wetting layer, various degrees of attack by silicon are observed, which appear to be due to the absence of the heat treatment step, but do appear to correlate with the process conditions used to form the oxidized film. For example, as seen from FIG. 5A, silicon, which appears as the white rings surrounding the silicon carbide fibers, has fully infiltrated into the matrix layer. While in FIG. 5B, silicon infiltration has stopped at the oxidized film border and did not fully infiltrate into the silicon carbide fibers where the matrix layer was oxidized. Due to the process conditions used to form the oxidized film, it is expected that the oxidized film formed on the CMC shown in FIG. 5A was significantly thinner than the oxidized film formed on the CMC shown in FIG. 5B. Accordingly, the oxidized film's thickness and potentially the chemical composition of the film is key to providing protection from silicon attack. If the silicon attack shown in FIG. 5B would penetrate no farther into the matrix, the resultant CMC might have acceptable mechanical strength. However, it is preferred to have no penetration, given that over lifetime the CMC may be adversely impacted by continued diffusion of silicon towards the fibers.

Example 4

Figure 6:
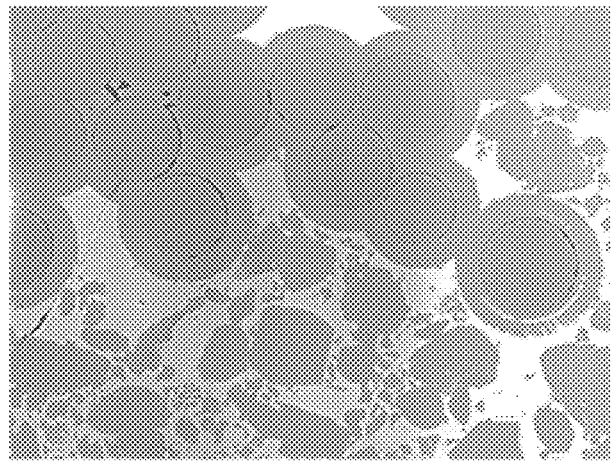
FIG. 6 is an image taken by a light/laser microscope that shows a cross-sectional view of an example ceramic matrix composite (CMC), where the matrix layer 103 was not oxidized.

Another example ceramic matric composite (CMC) prepared following similar processing to Example 1, except that the matrix layer was not oxidized. Silicon attack on the fiber was observed (see FIG. 6) and the ultimate tensile strength of the resultant CMC component at 800° C. in ambient air was found to be about 33 ksi, suggesting a degradation of the fiber, compared to Example 1 when the matrix layer was oxidized.

Example 5

Figure 7:
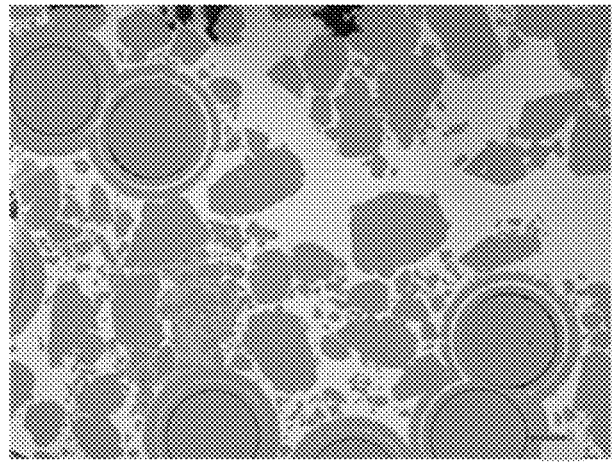
FIG. 7 is an image taken by a light/laser microscope that shows a cross-sectional view of an example ceramic matrix composite (CMC), exposed to flowing argon, rather than flowing nitrogen, during a heat treatment step.

Similar processing to Example 4, except that a flow of argon, rather than a flow of nitrogen, was used as the carrier gas during the heat treatment of the preform. Silicon attack on the fiber was observed (see FIG. 7) and the ultimate tensile strength of the resultant CMC component at 800° C. in ambient air was about 34 ksi. Given that the ultimate tensile strength value of the CMC component of this example is similar to the CMC component produced according to Example 4 under a flow of nitrogen, suggesting that a surface silicon nitro carbide (e.g., $Si_xC_yN_z$) layer was not formed on the preform during heat treatment in a flow of nitrogen, at least in the absence of the oxidized film. A surface $Si_xC_yN_z$ layer might be expected to form when the matrix layer is heat treated at a high temperature under a nitrogen atmosphere, which would provide an additional barrier layer against silicon attack and the resultant CMC component would have had a higher ultimate tensile strength.

Example 6

Figure 8:
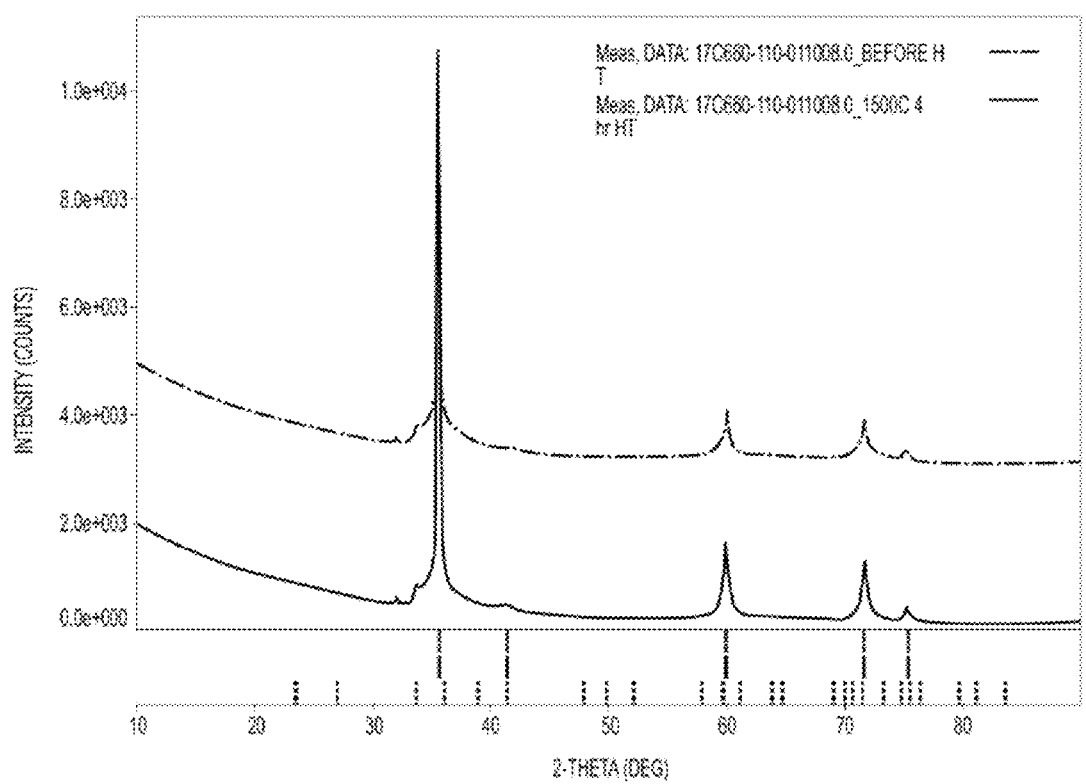
FIG. 8 shows x-ray diffraction (XRD) scans of an example preform containing the matrix layer 103—oxidized film 104—wetting layer 105 assembly, before and after a heat treatment.

FIG. 8 displays X-ray diffraction (XRD) scans taken before and after a heat treatment of the preform containing layers 102, 103, 104, and 105. Based on the XRD scans, it is clear that sharper diffraction peaks were observed after the heat treatment, indicating that there is an improvement in silicon carbide (SiC) crystallinity with heat treatment.

While various embodiments have been described, it will be apparent to those with ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of making a ceramic matrix composite that exhibits improved mechanical strength. The method comprises forming an interphase coating on one or more silicon carbide fibers; depositing a matrix layer comprising silicon carbide on the interphase coating; oxidizing the matrix layer to form an oxidized film comprising silicon oxide; depositing a wetting layer comprising silicon carbide on the oxidized film; after depositing the wetting layer, heat treating a fiber preform comprising the one or more silicon carbide fibers; after the heat treatment, infiltrating the fiber preform with a slurry; and after infiltration with the slurry, infiltrating the fiber preform with a melt comprising silicon or a silicon alloy and then cooling the melt, thereby forming a ceramic matrix composite.

A second aspect relates to the method of the first aspect, wherein forming the interphase coating, depositing the matrix layer, and depositing the wetting layer each comprise chemical vapor infiltration.

A third aspect relates to the method of the first or second aspect, wherein a thickness of the matrix layer lies in a range from about 0.5 μm to about 15 μm.

A fourth aspect relates to the method of any preceding aspect, wherein a thickness of the wetting layer lies in a range from about 0.2 μm to about 2 μm.

A fifth aspect relates to the method of any preceding aspect, wherein oxidizing the matrix layer comprises exposing the matrix layer to ambient air at a temperature of at least about 700° C.

A sixth aspect relates to the method of any preceding aspect, wherein oxidizing the matrix layer takes place for a time duration of at least about 4 hours.

A seventh aspect relates to the method of any preceding aspect, wherein oxidizing the matrix layer comprises oxidizing only an outer portion of the matrix layer.

An eighth aspect relates to the method of any preceding aspect, wherein the outer portion has a thickness in a range from about 1 nm to about 10 nm.

A ninth aspect relates to the method of any preceding aspect, wherein heat treating the fiber preform is carried out at a temperature of at least about 1450° C.

A tenth aspect relates to the method of any preceding aspect, wherein heat treating the fiber preform is carried out in a flow of nitrogen gas.

An eleventh aspect relates to the method of any preceding aspect, wherein heat treating the fiber preform occurs over a time duration of at least about 2 hours.

A twelfth aspect relates to the method of any preceding aspect, wherein the ceramic matrix composite has a tensile strength of at least about 50 ksi when tested under tension at 800° C. in ambient air.

A thirteenth aspect relates to the method of any preceding aspect, further comprising, prior to forming the interphase coating, forming the fiber preform comprising the silicon carbide fibers.

A fourteenth aspect relates to the method of any preceding aspect, wherein forming the fiber preform comprises laying up a plurality of plies comprising tows of the silicon carbide fibers.

A fifteenth aspect relates to the method of any preceding aspect, wherein the interphase coating comprises boron nitride, silicon-doped boron nitride, and/or pyrolytic carbon.

A sixteenth aspect relates to the method of any preceding aspect, wherein a thickness of the interphase coating lies in a range from about 0.10 µm to about 5.0 µm.

A seventeenth aspect relates to a fiber preform for fabricating a ceramic matrix composite, the fiber preform comprising: silicon carbide fibers coated with a plurality of functional layers, the functional layers including: an interphase coating on the silicon carbide fibers; a matrix layer comprising silicon carbide on the interphase coating; an oxidized film comprising silicon oxide on the matrix layer; and a wetting layer comprising silicon carbide on the oxidized film.

An eighteenth aspect relates to the fiber preform of the seventeenth aspect, wherein the interphase coating comprises boron nitride, silicon-doped boron nitride, and/or pyrolytic carbon.

A nineteenth aspect relates to the fiber preform of the seventeenth or eighteenth aspect, wherein the ceramic matrix composite has a tensile strength of at least about 50 ksi when tested under tension at 800° C. in ambient air.

A twentieth aspect relates to the fiber preform of any preceding aspect, wherein the oxidized film has a thickness in a range from about 1 nm to about 10 nm.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of making a ceramic matrix composite that exhibits improved mechanical strength, the method comprising:

forming an interphase coating on one or more silicon carbide fibers;

depositing a matrix layer comprising silicon carbide on the interphase coating;

oxidizing the matrix layer to form an oxidized film comprising silicon oxide;

depositing a wetting layer comprising silicon carbide on the oxidized film;

after depositing the wetting layer, heat treating a fiber preform comprising the one or more silicon carbide fibers;

after the heat treatment, infiltrating the fiber preform with a slurry; and after infiltration with the slurry, infiltrating the fiber preform with a melt comprising silicon or a silicon alloy and then cooling the melt, thereby forming a ceramic matrix composite.

2. The method of claim 1, wherein forming the interphase coating, depositing the matrix layer, and depositing the wetting layer each comprise chemical vapor infiltration.

3. The method of claim 1, wherein a thickness of the matrix layer lies in a range from about 0.5 µm to about 15 µm.

4. The method of claim 1, wherein a thickness of the wetting layer lies in a range from about 0.2 µm to about 2 µm.

5. The method of claim 1, wherein oxidizing the matrix layer comprises exposing the matrix layer to ambient air at a temperature of at least about 700° C.

6. The method of claim 1, wherein oxidizing the matrix layer takes place for a time duration of at least about 4 hours.

7. The method of claim 1, wherein oxidizing the matrix layer comprises oxidizing only an outer portion of the matrix layer.

8. The method of claim 7, wherein the outer portion has a thickness in a range from about 1 nm to about 10 nm.

9. The method of claim 1, wherein heat treating the fiber preform is carried out at a temperature of at least about 1450° C.

10. The method of claim 1, wherein heat treating the fiber preform is carried out in a flow of nitrogen gas.

11. The method of claim 1, wherein heat treating the fiber preform occurs over a time duration of at least about 2 hours.

12. The method of claim 1, wherein the ceramic matrix composite has a tensile strength of at least about 50 ksi when tested under tension at 800° C. in ambient air.

13. The method of claim 1, further comprising, prior to forming the interphase coating, forming the fiber preform comprising the one or more silicon carbide fibers.

14. The method of claim 13, wherein forming the fiber preform comprises laying up a plurality of plies comprising tows of the one or more silicon carbide fibers.

15. The method of claim 1, wherein the interphase coating comprises boron nitride, silicon-doped boron nitride, and/or pyrolytic carbon.

16. The method of claim 1, wherein a thickness of the interphase coating lies in a range from about 0.10 µm to about 5.0 µm.

* * * * *